Aug. 7, 1945.   O. W. CARLSTEIN   2,381,645
APPARATUS FOR DETERMINING UNBALANCE IN ROTORS
Filed Dec. 16, 1942
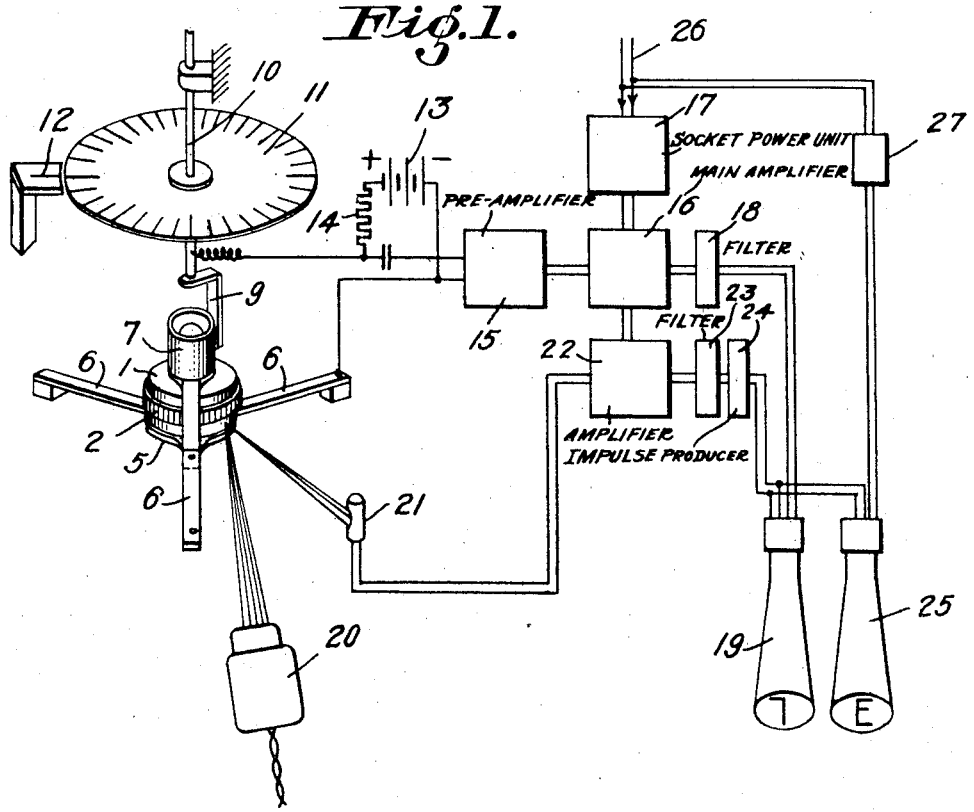
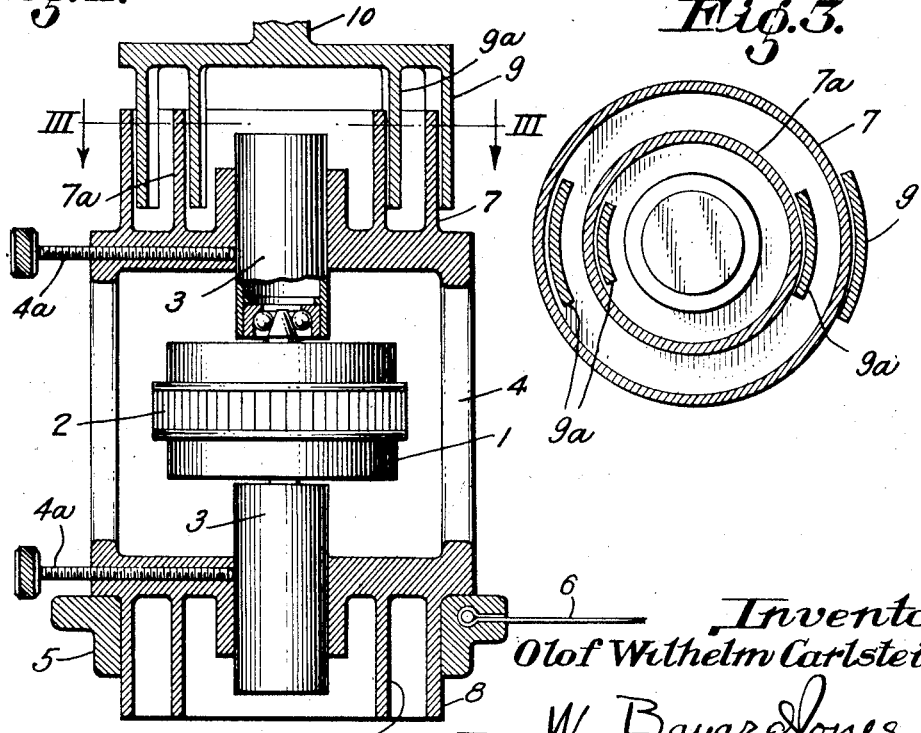
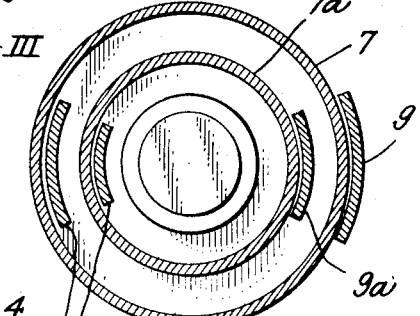
Inventor
Olof Wilhelm Carlstein
By W. Bayard Jones
Attorney.

Patented Aug. 7, 1945

2,381,645

UNITED STATES PATENT OFFICE 2,381,645

APPARATUS FOR DETERMINING UNBALANCE IN ROTORS

Olof Wilhelm Carlstein, Stockholm, Sweden, assignor to Aktiebolaget Aerotransport, Stockholm, Sweden, a company of Sweden Application December 16, 1942, Serial No. 469,228
In Sweden November 1, 1941

14 Claims. (Cl. 73—66)

The present invention relates to an apparatus for determining unbalance in rotors, for instance rotors of gyroscopes. It is well known that rotors of gyroscopes are required to be very accurately balanced. This is for the reason that, when in operation, such rotors run at a high speed of rotation, about 10,000 to 40,000 R. P. M., hence the bearings of the rotor are subjected to much wear. It is necessary, therefore, to endeavour to reduce the stresses on the bearings by balancing the rotor as perfectly as possible. The operation of balancing a rotor involves essentially two steps, the first step consisting in determining the magnitude and the position of the unbalanced weight in the rotor, and the second step consisting in removing the proper amount of material from the proper spot on the rotor by drilling one or more holes therein. The determination of the magnitude and position of the unbalance in the rotor should preferably be effected while the rotor runs at a speed of rotation which lies at or in the vicinity, at least, of the above mentioned normal number of revolutions of the rotor. It is also important that it shall be possible to determine the position of the unbalance with great accuracy in order afterwards to obtain balance of the rotor with the least possible number of drillings, since in certain types of rotors it is important that the weight of the rotor shall be changed as little as possible. The apparatus must also meet high demands on reliability and accuracy of operation, and it must be easy to operate. These demands, however, have not been satisfactorily met by the balancing apparatuses heretofore proposed for this purpose.

The position of the unbalanced weight of the rotor must, of course, be determined with relation to an arbitrary predetermined point on the rotor, and therefore, in order to effect the determination of the position of the unbalanced weight, it is necessary to provide a signal which continuously gives an indication of the location of the said predetermined reference point while the rotor rotates. It has already been proposed for this purpose to generate a series of potential impulses having a frequency corresponding to the speed of rotation of the rotor in such manner that the said impulses correspond to and give an indication of the instants at which during the rotation of the rotor the said predetermined reference point on the same passes a fixed point. It has also been proposed to produce the said series of potential impulses with the aid of a source of light from which a stationary beam of light is projected against and reflected by a polished spot or section on the circumference of the rotating rotor, to a photocell. The point of reflection on the circumference of the rotor then constitutes the above-mentioned fixed point, while the above-mentioned predetermined reference point on the rotor may be selected in any convenient manner relatively to the polished spot, for instance in such manner that the said predetermined reference point coincides with one of the border lines between the polished spot or section and the remaining dull section of the circumference of the rotor.

Assuming that the revolving rotor is supported in such manner, for instance at one end only, that its other end is not restrained from motion, then, if the rotor is unbalanced, the unbalanced weight will cause the free end of the rotor to perform a swinging or gyratory movement around the point of support of the rotor, thus causing vibrations of the rotor which have the same frequency as the speed of rotation of the rotor. It has been proposed to utilize these vibrations as a means for determining the magnitude of the unbalance and the position of the same by causing the said vibrations to produce an alternating potential having a frequency corresponding to the speed of rotation of the unbalanced rotor, and by the aid of such alternating potential to determine the magnitude of the unbalance, and further, by comparing the phase of said alternating potential with that of the reference signal, i. e., the series of potential impulses, to determine the angular position of the unbalanced weight relatively to the predetermined reference point. It has been proposed to use a mechanical or a dynamic electromagnetic pick-up associated with the rotor for causing the vibrations of the latter to produce the desired alternating potential. With the use of such electromagnetic pick-up, however, the resultant alternating potential becomes proportional to the velocity of the vibrations, and therefore, it does not provide a direct indication of the magnitude of the unbalance.

According to the present invention, for determining the magnitude of the unbalanced weight and the position of the same, means are provided for generating an alternating potential which has a frequency corresponding to the speed of rotation of the unbalanced rotor and which has an amplitude which is responsive to the magnitude of the vibrations of the rotor, that is, to the amplitude of said vibrations which is directly proportional to the magnitude of the unbalanced weight. In this way the amplitude of the alternating potential provides a direct indication or measure of the magnitude of the unbalanced weight. According to the present invention the said means for generating an alternating potential comprises a variable condenser the capacity of which is varied by the vibrations of the unbalanced rotor. In order to facilitate a phase comparison between said alternating potential and the above mentioned series of reference impulses for determining the position of the unbalance relatively to the predetermined reference point, a portion of the condenser is suitably adjustable angularly around the axis of rotation of the rotor.

The variable condenser produces a variation of the potential, i. e., an amplitude, which is proportional to the magnitude of the vibrations and which is independent of the velocity of the same at the speeds here concerned, which is of great importance for the proper function of the apparatus. The condenser is also free from the disturbing influence of electric currents, for instance such currents as are generated when rotors are being balanced which are provided with electric windings. Also, the use of a condenser for the purpose here contemplated provides the advantage that the change of the capacity of the condenser remains constant for a certain magnitude, i. e., amplitude, of the vibrations.

According to the present invention the reference series of impulses and the alternating potential are separately supplied to an indicator instrument by means of which the phase relationship between the said series of impulses and the alternating potential can be determined. Preferably, the indicator instrument consists of a cathode ray tube having deflecting means for deflecting the cathode ray in two directions perpendicular to one another, the series of reference impulses being supplied through a linear amplifier to one of said deflecting means, and the alternating potential through a second linear amplifier to the other deflecting means. This arrangement provides the advantage that the photocell circuit and the condenser circuit may be connected to the indicator instrument during the entire period of operation, since the potentials supplied from said circuits are amplified independently of one another, and it is not necessary to adjust the intensity of the source of light. The magnitude of the potential produced by the photocell relatively to the magnitude of the potential produced by the condenser may be arbitrary, and therefore, differences in the amplifying power of the two amplifiers as well as variations in the intensity of light from the light source possibly caused by variations in the voltage of the lighting mains, are of no importance.

According to a preferred embodiment of the invention, the apparatus consists principally of a frame or the like in which the rotor may be rotatably journalled in such manner that the axis of the rotor is vertical, and which is movably supported, for instance by means of springs, in such manner that it may be put in a swinging or gyratory movement corresponding to the vibrations of the unbalanced rotor, a portion of said frame forming one plate of the variable condenser, a second condenser plate being rotatably journalled adjacent the said portion of said frame and extending across a small part only of the circumference of said frame portion and being adjustable in different positions along said circumference, the said condenser being connected over an amplifier or several amplifiers with the indicator instrument, a source of light being located at the side of said frame and serving to project a beam of light against the rotor journalled in said frame, and a photocell connected over an amplifier or several amplifiers with the indicator instrument. The latter may suitably consist of a cathode ray tube, as stated here above.

The accompanying drawing illustrates by way of example an apparatus of this kind. Fig. 1 shows schematically the apparatus in its entirety, certain parts of the apparatus being shown in perspective view. Fig. 2 shows to a larger scale a vertical section through the frame in which the rotor is journalled, and Fig. 3 is a horizontal section on the line III—III in Fig. 2.

Referring to the drawing, 1 denotes the rotor to be balanced, which is provided in the ordinary manner with a row of vanes 2 at its circumference, the rotor illustrated being of the type that, in normal operation, is driven by means of a jet of air under pressure which is directed against the said row of vanes. For the purpose of effecting the balancing, that is the determination of the magnitude and direction of the unbalance, the rotor 1 is journalled in two bearings 3 which are slidable in the axial direction in a frame or housing 4, so that by separating said bearings 3 from one another, the rotor 1 may be inserted between the bearings, which are then moved towards one another so that the rotor becomes journalled in the bearings. The bearings are then secured in the frame 4 by means of set screws 4a which are screw-threaded in the frame 4. The frame or housing 4 is then placed in a supporting device consisting of a ring 5 which is attached to the stand of the apparatus, which is not shown in the drawing, by means of three leaf springs 6 which are spaced at an angular distance of 120° from one another, as shown in Fig. 1, so that the axis of the rotor 1 will assume a vertical position. The springs 6 effect very little damping of the comparatively small vibrations here involved, and for this reason the upper end of the rotor may be deemed to the practically free to perform a swinging or gyratory motion.

The upper and lower ends of the frame 4 are formed as cylindrical sleeves 7 and 8 coaxial to the axis of the rotor. Located adjacent to the upper sleeve 7 is an arcuate arm or plate 9 which overlies a small portion of the circumference of the sleeve 7 and which is supported by a shaft 10 rotatably journalled in the stand of the apparatus in alignment with the axis of the rotor. The shaft 10 supports a graduated disk 11, adjacent the periphery of which a stationary pointer 12 is provided. By turning the shaft 10, the arm or plate 9 may thus be adjusted to different positions around the sleeve 7, and the angle of such rotation may be read off on the disk 11.

The upper sleeve 7 and the plate 9 constitute the two plates of a variable condenser which is charged to a suitable potential, for instance by a battery 13 in the circuit of which a resistance 14 is connected. This condenser is connected through a pre-amplifier 15 and a main amplifier 16, to which current is supplied, for instance, from a lighting network 26 over a socket power unit 17, and preferably, for reasons explained here below, through a filter 18 with the one pair of deflection means of a cathode ray tube 19, for instance the means for deflecting the cathode ray in the vertical direction.

At the side of and on a level with the rotor 1 journalled in the frame 4 there are provided a light source 20 with associate lens means for directing a beam of light upon the rotor, and a photocell 21 to which the beam of light is reflected from the rotor. The photocell 21 is connected through an amplifier 22 with the other pair of deflecting means in the cathode ray tube 19 for the purpose of deflecting the cathode ray in the horizontal direction. Preferably, a filter 23 and an impulse producer 24 are connected between the amplifier 22 and the tube 19 for reasons that will be explained here below. In the constructional form illustrated, the photocell 21 is also connected through the impulse producer 24 to one pair of deflection means of a second and smaller cathode ray tube 25 which serves as a speed indicator to render it possible to control that the rotor 1 rotates with the correct number of revolutions during the determination of the unbalance, in the manner further described here below.

In the commercial production of the apparatus above described it may be suitable to provide the upper and lower ends of the frame 4 with an additional condenser sleeve 7a and 8a, respectively, as illustrated in Figs. 2 and 3, said sleeves being located within and concentrically to the sleeves 7 and 8, and to supplement the condenser plate 9 with three additional similar plates 9a, the location of which relatively to the sleeves 7 and 7a is illustrated in Figs. 2 and 3. In this way a condenser is provided which has a larger capacity and thus produces stronger current pulsations.

After the unbalanced rotor to be tested or balanced has been placed in the frame 4, a current of air under pressure is directed against the row of vanes on the rotor to cause it to rotate at approximately the normal speed, for instance 9000 R. P. M. Owing to the unbalance of the rotor, the upper portion of the frame 4 with the condenser sleeves 7 and 7a thereon will perform a gyratory movement around the point of intersection of the three spring 6 with the axis of the rotor. Owing to this movement, the capacity of the variable condenser 7, 7a and 9, 9a is varied, and the condenser will be charged and discharged at a frequency which corresponds to the rotational speed of the rotor 1. The pulsating current thus generated produces variations in the potential across the resistance 14, and the amplitude of this alternating potential constitutes a measure of the magnitude of the unbalance. The said alternating potential is amplified by means of the amplifiers 15 and 16 and produces, in the instance above assumed, a deflection of the cathode ray in the tube 19 in the vertical direction, so that the length of the vertical line of light on the screen of the tube 19 becomes proportional to the magnitude of the unbalance of the rotor.

While very great accuracy is applied to the manufacture of bearings for rotors of gyroscopes, still small defects in such bearings cause vibrations and corresponding alternating potentials which would render the figure on the screen of the cathode ray tube indistinct if such potentials were allowed to reach said tube. Since those potentials which are generated by vibrations and capacity changes caused by defects in the bearings, have another frequency than those which are caused by the unbalance of the rotor, the former can easily be separated from the latter by means of a suitable filter. To this end the filter 18 which, to serve its purpose, should have a narrow band, is connected between the main amplifier 16 and the tube 19. This filter also cuts off such potentials of a low frequency which may be generated owing to vibrations in the supporting structure caused by machines or the like placed in the vicinity of the balancing apparatus.

The position of the unbalance is determined by comparing the phase of the alternating potential produced by the condenser with that of a signal current or series of potential impulses which is generated by the aid of the source of light 20 and the photocell 21. By making a portion of the circumference of the rotor 1 against which a beam of light is projected from the source of light 20, highly polished while the remainder of said circumference is dull, a ray or glimpse of light is reflected from the said highly polished portion to the photocell once during each rotation of the rotor. In this way a series of potential impulses is generated in the circuit of the photocell and provides a continuous record of the position of the highly polished spot, and thus of the reference point on the rotor, relatively to the fixed point of reflection. These potential impulses are amplified by means of the amplifier 22 and are supplied to the cathode ray tube 19 in which, in the instance above assumed, they produce deflection of the cathode ray in the horizontal direction. Assuming that the polished portion of the circumference of the rotor 1 has a very small extension so that the impulses are very short, and further assuming that the amplified impulses are supplied directly from the amplifier 22 to the cathode ray tube 19, then the deflection of the cathode ray produced by the impulses would result in a horizontal line of light being formed on the screen of the tube. However, since the filter 18 causes phase displacement of the alternating potential from the condenser 7, 9, it is necessary to connect between the photocell current amplifier 22 and the cathode ray tube 19 a similar filter 23 to produce a corresponding phase displacement of the current from the photocell and thus compensate the said phase displacement of the alternating potential from the condenser. The said filter 23 converts the series of impulses from the photocell into a more or less sine-shaped alternating potential. In order that such alternating potential shall produce a horizontal line of light on the screen of the tube 19, it is necessary to connect an impulse producer 24 between the filter 23 and the tube 19 for converting the sine-shaped alternating potential into more pronounced impulse peaks. The use of an impulse producer in the manner described is also advisable for the reason that in practice it has proved suitable to extend the polished portion over half the circumference of the rotor and allow the other half to be dull, for the purpose of supplying as much light as possible to the photocell 21 during each revolution of the rotor, and in this case a sine-shaped alternating potential is produced in the circuit of the photocell which alternating potential must be converted into impulse peaks by means of the impulse producer in order that the desired horizontal line of light shall be produced on the screen of the tube.

It will easily be understood that a change of the position of the rotatable condenser plate 9 results in a phase displacement of the alternating potential generated by the condenser. It is possible, therefore, by rotating the condenser plate 9 around the sleeve 7 by the aid of the disk 11 to bring the alternating potential from the condenser 7, 9 in phase with the alternating potential or series of impulses from the photocell 21. When said potentials are in phase, a characteristic figure of the appearance illustrated in Fig. 1 is produced on the screen of the cathode ray tube 19, said figure consisting of the inverted letter L, i. e., the horizontal line of light extends from the upper end of the vertical line of light.

The initial setting of the graduated disk 11 is effected by the aid of a rotor in which the position of the unbalanced weight is known. A rotor may, for instance, be loaded with a weight on the radius through a predetermined reference point, such as the border line between the polished and the dull sections of the circumference of the rotor. This rotor is then placed in the apparatus and rotated at a predetermined speed, after which the condenser plate 9 is turned until the abovementioned figure on the screen of the tube 19 indicates that the alternating potential from the condenser is in phase with the alternating potential from the photocell. With the condenser plate 9 in this position the disk 11 is turned relatively to the plate 9, until the zero mark on the disk 11 coincides with the pointer 12, after which the disk is secured in this position to the shaft 10.

It will be understood, therefore, that in the case of a rotor being tested in the apparatus, when by turning the condenser plate 9 the alternating potential from the condenser has been brought in phase with the alternating potential from the photocell, it is possible to read off directly on the scale on the disk 11 the angle between the position of the unbalanced weight of the rotor and the predetermined reference point. The unbalance of the rotor is thus determined as to magnitude as well as to its position, and may therefore easily be removed by drilling a hole in the rotor, the depth of such hole being easily determined with the aid of the length of the vertical line of light on the screen of the cathode ray tube 19. If required, the rotor may be balanced at both ends by placing the frame 4 with the rotor upside down in the supporting ring 5 and then repeating the operation. After such turning, the variable condenser which serves for the determination of the magnitude of the unbalance, is formed by the plates 9, 9a and 8, 8a. The whole balancing operation may in this manner be performed in a few minutes. It has proved possible to determine the position of the unbalance on the rotor with an accuracy of about 5° which is more than what is necessary in practice.

The photocell 21 may be connected to the pair of deflection means of the cathode ray tube 25 which produce deflection of the cathode ray in the horizontal direction, the other pair of deflection means of said tube which produce deflection in the vertical direction being connected to the alternating current lighting network 26, preferably through a potentiometer device 27 for obtaining a suitable amplitude of the alternating current supplied to said deflection means. The speed of rotation at which the rotor 1 is being tested, and the frequency of the alternating current supplied from the lighting mains through the potentiometer 27 to the cathode ray tube 25, are so chosen relatively to one another that the frequency of the alternating potenial supplied from the photocell 21 to the cathode ray tube 25 becomes a whole number multiple of the frequency supplied from the lighting mains. For instance, if the rotor is tested at a speed of 9,000 R. P. M., the frequency of the current from the photocell 21 is 150 periods per second, and in such case it is suitable to connect the apparatus to a lighting network carrying a current of 50 periods per second. When the rotor 1 has attained the desired speed, 9,000 R. P. M., the current from the photocell 21 will produce three horizontal deflections of the cathode ray for each period of the current in the network, that is for each vertical deflection of the cathode ray, so that a figure of the shape of the letter E will be formed on the screen of the cathode ray tube 25, which figure marks that the rotor has attained the desired speed of rotation.

The constructional form above described may be modified and changed in several ways, and other embodiments of this invention may be made without departing from the principle and scope thereof, and it is intended, therefore, that all matter contained in the above description or shown in the drawing shall be interpreted as illustrative and not in a limiting sense.

I claim:

1. An apparatus for determining unbalance in rotors, comprising a frame for receiving and rotatably supporting a rotor with one end thereof free to perform a swinging movement around the point of support of the rotor corresponding to vibrations due to unbalance of the rotor, means for providing a series of indications of the position of a predetermined reference point on the rotating rotor by generating a series of potential impulses having a frequency corresponding to the speed of rotation of the rotor and responsive to the instants at which, during the rotation of said rotor, the predetermined reference point passes a fixed point, a stationary support, a variable condenser associated with said rotor supporting frame and adjustable angularly relatively to the same, said rotor supporting frame forming one plate of said variable condenser, a second plate of said condenser being rotatably mounted upon said stationary support so as to be rotatable about the axis of the rotor supported in said rotor supporting frame, a phase indication instrument, electrical means connecting said impulse generating means with said phase indication instrument, and electrical means connecting said condenser with said phase indication instrument.

2. An apparatus for determining unbalance in rotors, comprising a frame for receiving and rotatably supporting a rotor with one end thereof free to perform a swinging movement around the point of support of the rotor corresponding to vibrations due to unbalance of the rotor, means for providing a series of indications of the position of a predetermined reference point on the rotating rotor by generating a series of potential impulses having a frequency corresponding to the speed of rotation of the rotor and responsive to the instants at which, during the rotation of said rotor, the predetermined reference point passes a fixed point, said impulse generating means including a source of light for projecting a beam of light against a polished section of the circumference of the rotor, and a photocell to which said beam of light is reflected from said polished section of the circumference of the rotor, a stationary support, a variable condenser associated with said rotor supporting frame and adjustable angularly relatively to the same, said rotor supporting frame forming one plate of said variable condenser, a second plate of said condenser being rotatably mounted upon said stationary support so as to be rotatable about the axis of the rotor supported in said rotor supporting frame, a phase indication instrument, electrical means connecting said impulse generating means with said phase indication instrument, and electrical means connecting said condenser with said phase indication instrument.

3. An apparatus for determining unbalance in rotors, comprising a frame for receiving and rotatably supporting a rotor, means for supporting said frame with one end thereof free to perform a swinging movement around the point of support of the frame corresponding to vibrations due to unbalance of the rotor, a stationary support, a variable condenser associated with said frame and adjustable angularly relatively to the same, said condenser consisting of a sleeve on said frame coaxial with the axis of rotation of the rotor supported therein, said sleeve forming one plate of said condenser, and a second condenser plate located adjacent said sleeve on said frame and extending over a portion only of the circumference of said sleeve, said second condenser plate being rotatably journalled in said stationary support and angularly adjustable in different positions along the circumference of said sleeve on said frame, means for providing a series of indications of the position of a predetermined reference point on the rotating rotor by generating a series of potential impulses having a frequency corresponding to the speed of rotation of the rotor, and responsive to the instants at which, during the rotation of said rotor the predetermined reference points passes a fixed point, a phase indication instrument, electrical means connecting said impulse generating means with said phase indication instrument, and electrical means connecting said condenser with said phase indication instrument.

4. An apparatus for determining unbalance in rotors as defined in claim 3, wherein the condenser plate consisting of a sleeve on the rotor supporting frame is positioned at one end of said frame, said frame being provided at its opposite end with a second sleeve coaxial with the axis of rotation of the rotor supported in said frame, said second sleeve being adapted to serve as a plate of the condenser, the frame supporting means comprising a ring having an inner diameter corresponding to the outer diameter of such sleeves on said frame, whereby said frame may be held by said frame supporting means by inserting the sleeve at one end of said frame into said ring.

5. An apparatus for determining unbalance in rotors, comprising a frame for receiving and rotatably supporting a rotor with one end thereof free to perform a swinging movement around the point of support of the rotor corresponding to vibrations due to unbalance of the rotor, means for providing a series of indications of the position of a predetermined reference point on the rotating rotor by generating a series of potential impulses having a frequency corresponding to the speed of rotation of the rotor and responsive to the instants at which, during the rotation of said rotor, the predetermined reference point passes a fixed point, a stationary support, a variable condenser associated with said rotor supporting frame and adjustable angularly relatively to the same, said rotor supporting frame forming one plate of said variable condenser, a second plate of said condenser being rotatably mounted upon said stationary support so as to be rotatable about the axis of the rotor supported in said rotor supporting frame, a cathode ray tube having two pairs of deflection means for deflecting the cathode ray in two directions perpendicular to one another, electrical means connecting said impulse generating means with one pair of deflection means in said cathode ray tube, and electrical means connecting said condenser with the second pair of deflection means in said cathode ray tube.

6. An apparatus for determining unbalance in rotors as defined in claim 5, wherein the electrical means connecting the impulse generating means with one pair of deflection means in the cathode ray tube include a linear amplifier and an impulse producer, and the electrical means connecting the condenser with the second pair of deflection means in the cathode ray tube include a second linear amplifier.

7. An apparatus for determining unbalance in rotors as defined in claim 5, wherein the electrical means connecting the impulse generating means with one pair of deflection means in the cathode ray tube include a linear amplifier, a band pass filter and an impulse producer, and the electrical means connecting the condenser with the second pair of deflection means in the cathode ray tube include a second linear amplifier and a second band pass filter.

8. An apparatus for determining unbalance in rotors as defined in claim 5, further comprising means to determine the speed of rotation of the rotor, and electrical means connecting the impulse generating means to said speed determining means to operate said speed determining means.

9. An apparatus for determining unbalance in rotors, comprising a frame for receiving and rotatably supporting a rotor, means for supporting said frame with one end thereof free to perform a swinging movement around the point of support of the frame corresponding to vibrations due to unbalance of the rotor, means for providing a series of indications of the position of a predetermined reference point on the rotating rotor by generating a series of potential impulses having a frequency corresponding to the speed of rotation of the rotor and responsive to the instants at which, during the rotation of said rotor, the predetermined reference point passes a fixed point, said impulse generating means including a source of light for projecting a beam of light against a polished section of the circumference of the rotor, and a photocell to which said beam of light is reflected from said polished section of the circumference of the rotor, a stationary support, a variable condenser associated with said frame and adjustable angularly relatively to the same, said condenser consisting of at least one sleeve on said frame coaxial with the axis of rotation of the rotor supported therein, said sleeve forming one plate of said condenser, and at least one second condenser plate located adjacent said sleeve on said frame and extending over a portion only of the circumference of said sleeve, said second condenser plate being rotatably journalled in said stationary support and angularly adjustable in different positions along the circumference of said sleeve on said frame, a cathode ray tube having two pairs of deflection means for deflecting the cathode ray in two directions perpendicular to one another, means to determine the speed of rotation of the rotor, electrical means including a linear amplifier a band pass filter and an impulse producer connecting said photocell with one pair of deflection means in said cathode ray tube and with said speed determining means to operate said speed determining means, and electrical means including a second linear amplifier and a second band pass filter connecting said condenser with the second pair of deflection means in said cathode ray tube.

10. An apparatus for determining unbalance in rotors, comprising a frame for receiving and rotatably supporting a rotor, means for supporting said frame in such manner that one end thereof is free to perform a swinging movement around the point of support of the frame corresponding to vibrations due to unbalance of the rotor, a stationary support, a variable condenser associated with said frame and adjustable angularly relatively to the same, said condenser consisting of a sleeve on said frame coaxial with the axis of rotation of the rotor supported therein, said sleeve forming one plate of said condenser, and a second condenser plate located adjacent said sleeve on said frame and extending over a portion only of the circumference of said sleeve, said second condenser plate being rotatably journalled in said stationary support and angularly adjustable in different positions along the circumference of said sleeve on said frame, means for producing a consecutive series of indications of the position of a predetermined reference point on the rotating rotor by generating a series of reference potential impulses having a frequency corresponding to the speed of rotation of the rotor and responsive to the instants at which during the rotation of said rotor the predetermined reference point passes a fixed point, said reference potential generating means including a source of light for projecting a beam of light against a polished section of the circumference of the rotor, and a photocell to which said beam of light is reflected from said polished section of the circumference of the rotor, a phase indication instrument, electrical means connecting said reference potential generating means with said phase indication instrument, and electrical means connecting said condenser with said phase indication instrument.

11. An apparatus for balancing rotors as defined in claim 10, wherein the second condenser plate comprises two arcuate plate sections located in diametrically opposed positions with relation to the axis of rotation of said plate, one of said plate sections being located outside said sleeve on said frame, and the second of said plate sections being located inside said sleeve on said frame.

12. An apparatus for determining unbalance in rotors, comprising a frame for receiving and rotatably supporting a rotor, means for supporting said frame in such manner that one end thereof is free to perform a swinging movement around the point of support of the frame corresponding to vibrations due to unbalance of the rotor, a stationary support, a variable condenser associated with said frame and adjustable angularly relatively to the same, said condenser consisting of at least one sleeve on said frame coaxial with the axis of rotation of the rotor supported therein, said sleeve forming one plate of said condenser, and at least one second condenser plate located adjacent said sleeve on said frame and extending over a portion only of the circumference of said sleeve, said second condenser plate being rotatably journalled in said stationary support and angularly adjustable in different positions along the circumference of said sleeve on said frame, means for producing a consecutive series of indications of the position of a predetermined reference point on the rotating rotor by generating a series of reference potential impulses having a frequency corresponding to the speed of rotation of the rotor and responsive to the instants at which during the rotation of said rotor the predetermined reference point passes a fixed point, said reference potential generating means including a source of light for projecting a beam of light against a polished section on the circumference of the rotor, and a photocell to which said beam of light is reflected from said polished section of the circumference of the rotor, a cathode ray tube having two pairs of deflection means for deflecting the cathode ray in two directions forming an angle with one another, electrical means including a linear amplifier a band pass filter and an impulse producer connecting said photocell of said reference potential generating means with one pair of deflection means in said cathode ray tube, and electrical means including a second linear amplifier and a second band pass filter connecting said condenser with the second pair of deflection means in said cathode ray tube.

13. An apparatus for determining unbalance in rotors, comprising a frame for receiving and rotatably supporting a rotor, means for supporting said frame in such manner that one end thereof is free to perform a swinging movement around the point of support of the frame corresponding to vibrations due to unbalance of the rotor, a stationary support, a variable condenser associated with said frame and adjustable angularly relatively to the same, said condenser comprising a plurality of sleeves on said rotor supporting frame, said sleeves being concentric to one another and coaxial to the axis of rotation of the rotor supported in said frame, and a plurality of arcuate plates located adjacent said sleeves on said rotor supporting frame and each extending over a portion only of the circumference of the adjacent sleeve, means for rotatably journalling said arcuate plates in said stationary support to make said arcuate plates angularly adjustable in different positions along the circumferences of said sleeves on said frame, said arcuate plates being arranged in two groups diametrically opposed to one another with relation to the axis of rotation of said plates, the arcuate plates of one group being positioned outside the respective cooperating sleeves on said frame, and the arcuate plates of the other group being positioned inside the respective cooperating sleeves on said frame, means for producing a series of indications of the position of a predetermined reference point on the rotating rotor by generating a series of potential impulses having a frequency corresponding to the speed of rotation of the rotor and responsive to the instants at which during the rotation of said rotor the predetermined reference point passes a fixed point, a phase indication instrument, electrical means connecting said impulse generating means with said phase indication instrument, and electrical means connecting said condenser with said phase indication instrument.

14. An apparatus for determining unbalance in rotors, comprising a frame for receiving and rotatably supporting a rotor, means for supporting said frame in such manner that one end thereof is free to perform a swinging movement around the point of support of the frame corresponding to vibrations due to unbalance of the rotor, a stationary support, a variable condenser associated with said frame and adjustable angularly relatively to the same, said condenser comprising a plurality of sleeves on said rotor supporting frame, said sleeves being concentric to one another and coaxial to the axis of rotation of the rotor supported in said frame, and a plurality of arcuate plates located adjacent said sleeves on said rotor supporting frame and each extending over a portion only of the circumference of the adjacent sleeve, a shaft carrying said arcuate plates and journalled in said stationary support in alignment with the axis of the rotor supported in said frame whereby said arcuate plates are angularly adjustable in different positions along the circumferences of said sleeves on said frame, said arcuate plates being arranged in two groups diametrically opposed to one another with relation to said shaft, the arcuate plates of one group being positioned outside the respective cooperating sleeves on said frame, and the arcuate plates of the other group being positioned inside the respective cooperating sleeves on said frame, a graduated disk supported by said shaft, a stationary pointer adjacent the periphery of said disk, means for producing a series of indications of the position of a predetermined reference point on the rotating rotor by generating a series of potential impulses having a frequency corresponding to the speed of rotation of the rotor and responsive to the instants at which during the rotation of said rotor the predetermined reference point passes a fixed point, a phase indication instrument, electrical means connecting said impulse generating means with said phase indication instrument, and electrical means connecting said condenser with said phase indication instrument.

OLOF WILHELM CARLSTEIN.